US006041477A

United States Patent [19]

Rentsch et al.

[11] Patent Number: 6,041,477

[45] Date of Patent: Mar. 28, 2000

[54] SPRING-EFFECT HINGE ARRANGEMENT, FOR EXAMPLE FOR ONE-PIECE INJECTED PLASTIC CLOSURES

[76] Inventors: Rudolf Rentsch, Pfannenstilstr. 11, CH-8706 Meilen; Louis Lagler, Nurenbergstr. 25, CH-8037 Zürich; Bruno Streich, Kirchgasse 28, CH-8001 Zürich, all of Switzerland

[21] Appl. No.: 08/981,619

[22] PCT Filed: Jun. 26, 1996

[86] PCT No.: PCT/EP96/02780

§ 371 Date: Mar. 16, 1998

§ 102(e) Date: Mar. 16, 1998

[87] PCT Pub. No.: WO97/02189

PCT Pub. Date: Jan. 23, 1997

[30] Foreign Application Priority Data

Jul. 1, 1995 [CH] Switzerland ............................ 1933/95

[51] Int. Cl.$^{7}$ ...................................................... F16C 11/12

[52] U.S. Cl. ...................... 16/225; 16/DIG. 13; 215/235; 220/337

[58] Field of Search .............................. 16/225, DIG. 13; 215/235, 237; 220/335, 337, 339

[56] References Cited

U.S. PATENT DOCUMENTS

| | | | |
|---|---|---|---|
| 4,386,714 | 6/1983 | Roberto et al. | 220/339 |
| 4,503,991 | 3/1985 | Joyce | 220/339 |
| 4,594,816 | 6/1986 | Goldstein | 16/225 |
| 4,854,473 | 8/1989 | Dubach | 220/335 |
| 5,007,555 | 4/1991 | Beck | 220/339 |
| 5,735,418 | 4/1998 | Erb et al. | 215/237 |

FOREIGN PATENT DOCUMENTS

| | | | |
|---|---|---|---|
| 0 147 423 | 8/1986 | European Pat. Off. . | |
| 331 940 | 9/1989 | European Pat. Off. | 16/225 |

*Primary Examiner*—Anthony Knight
*Assistant Examiner*—Alison K. Pickard

[57] ABSTRACT

A resilient hinge arrangement does not utilize a principal hinge but instead includes at least two hinge parts. One or more tilting steps are arranged in series and are constructed from at least two connecting elements, each of which is formed by a rigid pressure element and a tensionally elastic tension element. The connecting element are each attached, via a hinged connection, normally a film hinge, either to intermediate members or directly to the hinge parts. The pressure and tension elements are arranged to be at least substantially shear-resistant with respect to each other through an associated shear element.

31 Claims, 9 Drawing Sheets

SPRING-EFFECT HINGE ARRANGEMENT, FOR EXAMPLE FOR ONE-PIECE INJECTED PLASTIC CLOSURES

FIELD OF THE INVENTION

This application is the national phase under 35 U.S.C. §371 of prior PCT International Application No. PCT/EP96/02780 which has an International filing date of Jun. 26, 1996 which designated the United States of America, the entire contents of which are hereby incorporated by reference.

The present invention relates to a hinge structure and more particularly to a hinge structure provide snap action especially using resilient thin film hinges according to the preamble to patent claim 1.

BACKGROUND OF THE INVENTION

Various resilient hinges, such as those which are used, in particular, for one-piece extruded plastics closing means, are known from the prior art. As a rule, a so-called snap effect is to be achieved in such hinges for plastics closing means. The term 'snap effect' designates an automatic opening of the hinge after a specific initial deflection (dead centre) forced upon the hinge system, and an analogous effect during closing, in that the hinge automatically returns into a closed position once it has passed a dead centre. This effect is, basically, brought about by special spring elements. Within the context of such snap effects, the snapping force and the working angle are characteristic quantities. The term 'snapping force' designates the resistance of the hinge system to opening or closing. The working angle is defined by the region which the parts of the hinge need to overcome automatically, on the basis of spring action, and is, accordingly, defined by the region between the resting positions of the hinge parts.

In the greater majority of such hinges, the basic principle resides in a pivoting of a cover member about a defined rotational movement axis.

European Patent EP 0 056 469 describes a hinge for a plastics closing means, the rotational axis of which is clearly defined and is formed by a defined principal film hinge interconnecting the cover and the sealing body. The snap effect is achieved by a co-operation with spring arms which are arranged on the side of this principal hinge. In one embodiment, the snap effect is based on the bending of U-shaped intermediate elements, while, in another embodiment, it is based on a bending of wall regions of the sealing members, the sealing cap, as a rule, undergoing a bending in the centre region. In this instance, too, the snap effect is brought about by bending actions about the narrow side.

The hinge arrangements known from the WO 92/13775 or EP 0 331 940 patents use primary bending effects in combination with a rotational axis in order to achieve a spring effect for a snap effect. Because of the available geometric rotational axes, the corresponding closing means open along a substantially circular path. In the constructions mentioned, certain parts protrude beyond the outer contour of the closing means, when the closing means is closed.

U.S. Pat. No. 5,148,912 describes a hinge arrangement for a closing means comprising a closure body and a cap, wherein the closing means has the same circular cross-section as the closure body itself. The cap and the closure body are interconnected via two flexible strap-like connecting arms which are trapezoidal in design. These connecting arms are designed to be flexible and are secured to the closing means and to the closure body by means of thin-film regions. The film hinges of the thin-film regions on the side of the closure body are arranged at an angle relative to each other. When the closing means is viewed from the rear, these film hinges are, of necessity but co-incidentally, arranged in the form of a downwardly open V. The arrangement of the two film hinges on the side of the cap are arranged mirror-symmetrically relative thereto. This hinge does not have a good snap effect, since appropriate spring forces cannot develop.

The known hinge arrangements have various drawbacks. In all known hinges comprising a rotational axis, relative to which taut strips or similar elements are arranged so as to be offset (articulation axis offset), it is necessary for this rotational axis to be arranged beyond the outer contour of the closing means in convex injection-moulded closing means. For technical and aesthetic reasons, however, protruding elements are undesirable. A further drawback resides in that the snap effect cannot be predicted, because of complicated mechanical influences, and, as a rule, results in an inadequate snap effect or, alternatively, to an unacceptable stress of the material. A further drawback is the fact that conventional hinge arrangements permit only unpredictable and inadequate working angles which are frequently only about 100°. In the known basic concepts, it is a particular drawback, because of the unpredictable action, that complicated series of prototypes need to be produced in each case for a new geometry of the closing means desired for design reasons, in order to obtain technically satisfactory closing kinematics. The principal hinge, which is present in conventional closing means, necessitates that the parts of the closing means be disposed in very close proximity to each other in the injection-moulded state. The appropriate injection-moulding die thus has the drawback that the wall thicknesses in this region, due to the necessary connection between the closure bodies, must be designed to be very thin. The resultant cooling and wear-related problems arising have an adverse effect on the cycle time and the service life of the injection-moulding die.

A further restriction of such known hinge arrangements, which may be injection-moulded as a single piece of plastic material, resides in that it is possible to produce systems which have at most one snap effect. In other words, a maximum of two positions of rest on either side of at most one dead centre are achieved for the opening operation of the closing means. These positions of rest are, essentially, the open and the closed state of the closing means. Because of the regularly occurring plastic deformations, the open position of rest does not coincide with the position in the injection-moulded state.

The mechanical effects forming the basis of the functioning of such closing means are essentially bending spring effects. The energy required in order to deform a bending element by bending determines the snap force of the hinge. When an element is subjected to bending to an extent which is relevant for this effect, then the corresponding bending deformations in these elements are considerable, in comparison to its characteristic quantities (e.g. thickness of a bending plate) or the bending springs have a considerable spatial dimension in the unloaded state. In the case of very small closing means or in the case of particular geometries of the closing means (small bending radii in the region of the hinge), it is no longer possible to provide the required functional elements of conventional hinge arrangements, such as principal hinge and taut strips, or they produce inadequate snap effects or unacceptable stresses in respect of the material. In addition, a restriction resides in that the closing means must, of necessity, have a convex outer contour in the region of the hinge.

If the flow of force is observed in various available closing means of plastics material, considerable variations will be detected in identical types of closing means. In many constructions, thin-film regions (film hinges) are exposed to stresses to an extent which is unacceptably high. When a fixed rotational movement axis, in the form of a thin-film region, is preset for a closing means, it is possible to detect considerable coercion in the functionally significant elements, in particular in the film regions. Hinge parts which are, for example, firmly interconnected via a principal film hinge, form a relatively rigid unit, even in the open state. When the closing means, when the hinge is open, is forced to execute a relative movement, with respect to the main container, along the principal hinge, considerable stresses may be introduced into the functionally significant hinge elements as a result of this rigid cap/main container connection, accordingly resulting in a destruction of the closing means.

In all these conventional basic hinge concepts, the path described by the hinge parts relative to each other during opening or closing is, essentially, a circular path which is preset exactly by the principal film hinge. When demands are made with regard to the relative movement of the hinge parts during opening, these cannot be met by such constructions.

Many materials (also injection-moulding plastics materials) manifest an unfavourable behaviour if they are exposed to stress over an extended period. These creep and ageing effects have an adverse effect on the functioning of a closing means. It is thus a drawback that known hinge arrangements do not take this into account, often displaying considerable residual stresses in positions of rest.

SUMMARY AND OBJECTS OF THE INVENTION

Accordingly, it is an object of the invention to provide a hinge which, while manifesting largely predictable good snapping forces and permitting considerable working angles, if desired even in excess of 180°, permits a defined but variable relative movement of the parts of the closing means with respect to each other about a virtual movement axis and, if desired, a plurality of stable positions of rest, without any excessive stresses of the material. In addition, it is the object of the invention to provide a hinge which may be used even in small and complicated geometries of the closing means, in particular also in concave geometries, and which may be arranged substantially within the outer contour of the closing means. In particular, it should be possible for the injection-moulding die to be of an optimal design in order, on the one hand, to reduce the cycle time during production and, on the other hand, to increase the service life of the injection-moulding die.

A specific reciprocal movement curve of the hinge parts is advantageous, for example when a region comprising an obstruction must be overcome. The movement path is, however, also of significance when the two hinge parts comprise functionally co-operating elements. In the field of closing means of plastics material, it is, for example, important that the discharge opening and its sealing counterpart make contact with each other at an advantageous angle in order to ensure optimal sealing.

The invention makes possible a hinge system which includes, during the opening and the closing operation, two or more substantially stress-free positions of rest and dead centres disposed therebetween. The conditions on either side of the dead centres are predetermined and controlled. It is possible to achieve a plurality of snap effects with different snapping forces during an opening and closing procedure, on the basis of a constructive concentration of functional hinge elements for the controlled utilization of quasi-stable conditions. In this regard, the functionally significant mechanical effects are no longer bending effects about the narrow side, but are coordinated tension and pressure effects, together with their possible secondary manifestations. When functionally significant elements of the present invention are loaded for bending, this is only a secondary effect. Such bending deformations are usually best prevented by appropriate technical means (e.g. a rigid design of the pressure element concerned).

The hinge type according to the invention is also characterized in that, for example in injection-moulded one-piece plastics closing means, no troublesome parts protrude beyond the contour of the closing means.

The concept of the invention intends to design and to concentrate the required functional elements such that a substantially predictable kinematics of the closing means is achieved, it being ensured, at the same time, that the end positions and the intermediate positions of rest of the closing means are substantially stress-free.

According to the invention, the snap effect and, in particular, the snapping force are produced exclusively by the concentrated functional elements disposed between the hinge parts. It is thus possible for the cap and the sealing body of a plastics closing means to be designed to have a freely determinable rigidity and a geometry largely as desired.

Since the hinge parts are not rigidly connected to each other via a principal hinge in the rotational movement axis, it is ensured that unintentional relative movements of the hinge parts, for example torsional movements in a direction transverse to the pivoting movement, do not result in damage to the hinge. The invention does not comprise a fixed rotational movement axis. At any given moment during the movement procedure, it is possible to determine only a momentary spatially non-fixed pivot axis which may, temporarily, also be disposed to be skew. This virtual axis, which moves during the movement procedure, is not physically present and does not coincide with a structural component of the hinge. Nonetheless, the cap parts move on the course provided and reliably reach the end position provided for said parts. The position and the movement of this virtual axis and, thus, the relative movement of the hinge parts, are largely influenced and controlled via the geometric design of the hinge mechanism. A greater range of freedom is permitted and it is possible to provide an overall working angle of more than 180° with, if desired, a plurality of snap effects. Specific embodiments permit an at least substantially complete incorporation of the functional elements within the outer contour of the closing means, in particular in one-piece injection-moulded plastics closing means.

BRIEF DESCRIPTION OF THE DRAWINGS

The basic functional concept according to the invention and exemplified embodiments of the invention will be described in more detail with reference to the Figures and diagrams set out below.

DETAILED DESCRIPTION OF PREFERRED EMBODIMENTS

The invention is described in more detail hereinafter with reference to examples for one-piece injection-moulded plastics snap-closing means. The invention is, however, not restricted to such plastics parts. The hinge according to the invention, which pivotingly connects at least two hinge parts, comprises one or more tilting steps which are, in each case, edged by the hinge parts themselves. The purpose of a single tilting step is to impart to the hinge a specific partial snapping force and partial angles (relative to the entire opening/closing movement), and is responsible for a single snap effect. When numerous tilting steps are series-connected, the hinge has the same number of snap effects as it has tilting steps. During opening or closing, the hinge passes through the same number of dead centres as it has series-connected tilting steps. Each tilting step thus forms a specific part of the overall working angle. By means of a corresponding geometric arrangement of the functionally significant elements of a tilting step, it is possible for the corresponding partial angle to assume a certain size as desired. There is a relationship between the partial angle of a tilting step and the geometric arrangement, and this relationship is fully utilized.

Figure 1:
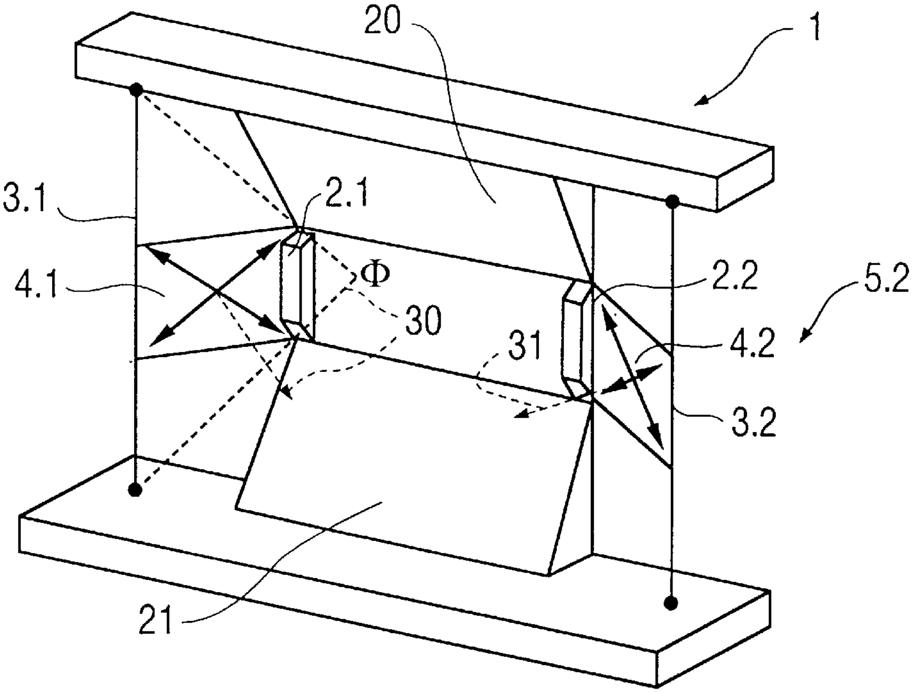
FIG. 1 shows a functional diagrammatic design of a tilting step 1 comprising two intermediate members 20, 21, two pressure elements 2.1, 2.2, two tension members 3.1, 3.2 and two pushing elements 4.1 and 4.2

FIG. 1 shows a diagrammatic illustration of the functional elements of a tilting step 1 in the closed state. The tilting step comprises two pressure elements 2.1, 2.2 which are pivotingly connected, for example via film hinges, to two intermediate members 20, 21. Two tension elements 3.1 and 3.2 are arranged parallel to these pressure elements. Two pushing or shear elements 4.1 and 4.2 are arranged between the pressure elements 2.1, 2.2 and the two tension elements 3.1, 3.2. Accordingly, the tilting step comprises two functional groups, i.e. two connecting elements 5.1, 5.2 which, in turn, each comprise a pressure element 2, a tension element 3 and a pushing element 4. The functionally significant elements are pivotingly connected to the rigid intermediate members 20 and 21. In plastics injection-moulded lids, it is possible to achieve this pivoting flexibility by means of thin-film regions or similar means. In the present instance, the intermediate members 20 and 21 define the tilting step 1; alternatively, the tilting step is directly connected to hinge parts which are not illustrated herein.

In order to arrive in the open state of a tilting step 1 from the closed state, the rigid intermediate members 20, 21 must be moved relative to each other such that the intermediate member 20 moves in a rearward direction about a momentary rotational axis which, in the present instance, is disposed substantially parallel to the connecting line of the centre points of the two pressure elements and which is not stationary during the closing operation. The force which is required for this purpose characterizes the snapping force of tilting step 1. A force of this kind occurs naturally during the opening of the hinge comprising the tilting step. The force required changes up to the point where the dead centre of the tilting step is reached. If this force increases, the stresses in the functionally significant elements are also increased. The tension elements 3.1, 3.2 are always more loaded for tension and the pressure elements 2.1, 2.2 always more for pressure. If these loads are within a range which is acceptable for the material used, the corresponding elements are reversibly shortened or extended. Energy is stored in these elements. The pressure and tension elements act in the manner of compressed springs or in the manner of flexibly tensioned spring members and bring about the spring effect in each connecting element. When the critical dead centre is reached, the tilting step automatically leaps into the open position.

The proportion and arrangement of the pressure elements 2.1, 2.2 and the tension elements 3.1, 3.2 are determined such that optimized working angle and the snapping forces are produced. What is essential is that the required forces of pressure are initiated in the pressure element and can be accommodated without any buckling. To this end, attention must be given to the thickness of the pressure elements relative to the thickness of the tension elements. An inadequate thickness of the pressure elements results in an unfavourable snapping behaviour. The auxiliary broken lines entered in FIG. 1 through the end points of the pressure and tension element of one connecting element 5.1, 5.2 encompass an angle Φ which, as will be explained hereinafter, is used according to the invention to ensure the desired partial angle of a tilting step. In addition, of significance for the purpose of ensuring an optimal snapping force is the looping angle encompassed in the end position of the closing means by two vectors 30 and 31 disposed normally relative to the planes extending through the pressure elements 2.1, 2.2 and the tension elements 3.1, 3.2. When translating the invention into practice, it must be ensured that the bending stresses caused in a pressure element, e.g. as a result of an eccentric pressure, are prevented, by suitable technical means, from causing the pressure element to buckle. For certain uses, it is possible for the pressure elements 2.1 and 2.2 to be connected to each other. It is possible for this connection advantageously to be in the form of a pressure-resistant or non-buckling plate which forms a unit together with the pressure elements. This pressure-resistant plate is secured regionally or, if required, along its entire breadth, to the intermediate members 20 and 21 by means of suitable hinge elements.

If conventional hinge systems for plastics closing means are observed, it is noted that closing means having different shapes or constructions, even if they are based on the same concept, have considerably differing snap effects and different snapping forces. Certain embodiments of these closing means even dispense entirely with a snap effect, although such an effect is an explicit objective of the corresponding patents. The reason for this resides in the complex mechanical actions which form the basis of such hinges, or it resides in that the hinge parts themselves contribute substantially to the functioning of the closing means and effects, which are largely or totally unpredictable, occur when there are even minor geometrical changes. These drawbacks are overcome by the present invention, in that functionally significant elements are reduced to a minimum, and they are localized and concentrated in their spatial extension, while, at the same time, permitting more flexible movement sequences, relative to conventional hinge concepts. This holds true, in particular, in a comparison to snap-closing means having fixed rotational movement axes which always describe a rotational movement, relative to each other, with one spatially fixed rotary axis.

The fundamental functional concept of the tilting step 1 resides in the presence of one or more pressure-loaded pressure elements 2.1, 2.2 which are in a working connection with correspondingly arranged tension-loaded tension elements 3.1, 3.2. By adjusting the pressure and tension elements relative to each other, as far as their spatial extension and their dimensions are concerned, it is ensured that the pressure and the tension forces are systematically introduced. In the case of undesirable movement sequences, it is not possible to prevent secondary pressure loads from acting on the tension element. The undesirable forces are, however, far smaller than the tension loads occurring during normal operations, and can indeed be disregarded in view of the intended function of the hinge. The same holds true for the pressure elements. In order to protect the hinge mechanism against shearing, and in order to prevent unacceptable movement sequences, at least one pushing or shear element 4.1, 4.2 is provided for each tilting step 1. In the case of plastics injection-moulded parts, this may be designed to be a thin shear-resistant membrane or thin-film region. This pushing element 4.1, 4.2 is of important significance for the invention of the embodiment, in that it prevents undesirable movement sequences and co-ordinates the parts of the closing means about their virtual movement axis. As shown in FIG. 1, it is possible for this pushing element to connect, in each case, a tension element to a pressure element, or it may be provided at a different point. The resilience and the overall working angle, i.e. the snap effect of a tilting step, are provided, according to the invention, essentially only by means of the pressure elements and the tension elements and not by means of bending springs.

Figure 2:
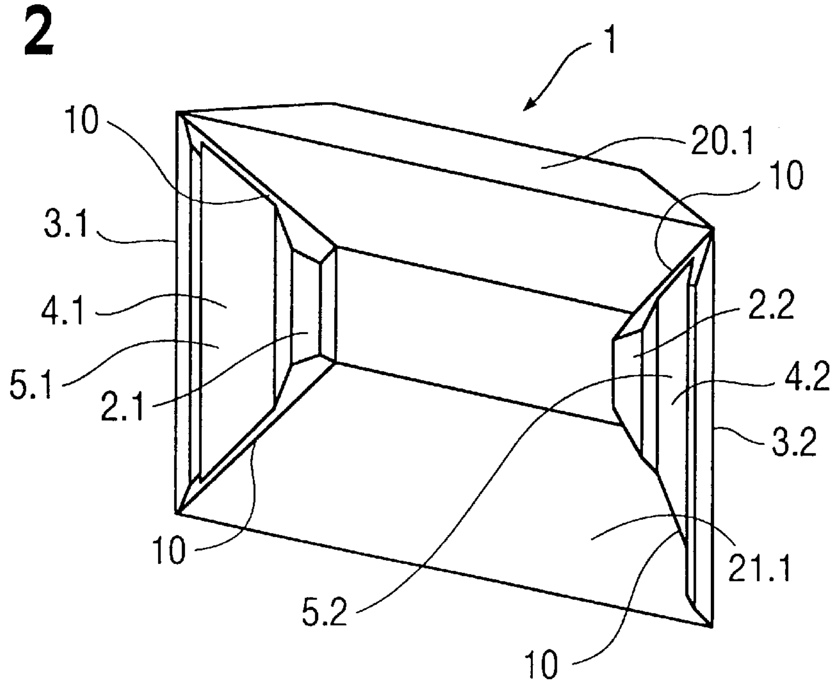
FIG. 2 shows an exemplified embodiment of a tilting step 1 in the closed state
Figure 3:
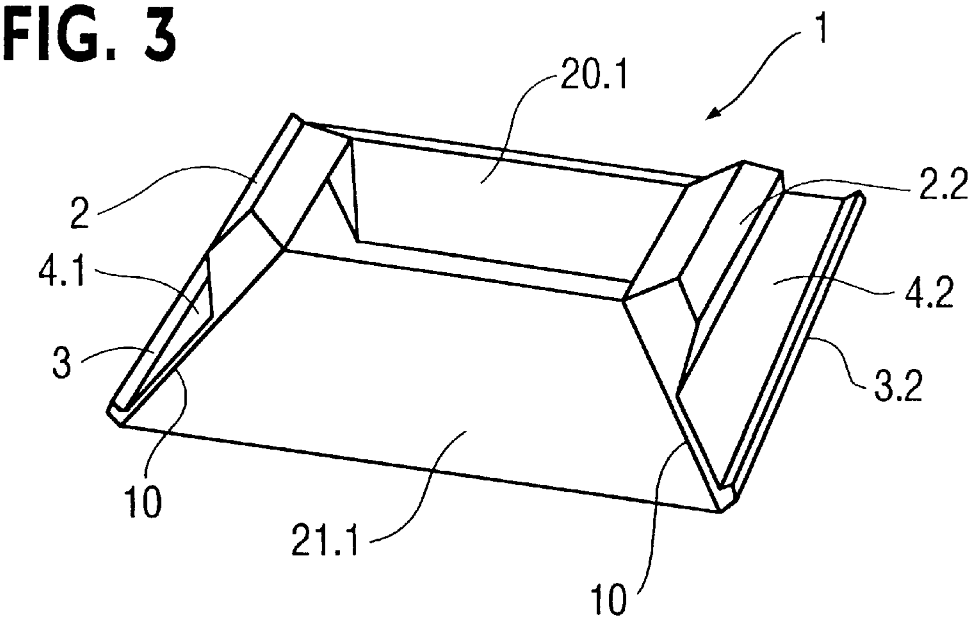
FIG. 3 shows the exemplified embodiment of FIG. 2 in the open state FIG. 4 schematically illustrates the movement curve and three tilting states of a hinge 25.1–25.3 comprising two series-connected tilting steps.

A preferred embodiment of a tilting step is illustrated in FIG. 2 and in FIG. 3. The two Figures show the tilting step 1, once in the closed state (FIG. 2) and in the open state (FIG. 3). It comprises two pressure elements 2.1 and 2.2., as well as two tension elements 3.1 and 3.2 The corresponding pushing elements 4.1, 4.2, which ensure the required co-operation between the pressure elements and the tension elements, are, in this instance, formed by shear-resistant membranes which are designed, in the present exemplified embodiment, in the form of a thin continuous membrane for optical reasons, especially when the hinge is produced of a plastics material in an injection-moulding process. These elements, produced in this manner and having a substantially trapezoidal shape, have a distinct reinforced pressure side and a distinct relatively thin tensionally elastic tension side. The tilting step 1 then comprises two connecting elements 5.1, 5.2 which are connected, via thin-film regions 10, to the rigid intermediate members 20.1, 21.1 which adjoin the tilting step. It is possible for stress in respect of the thin-film regions 10 to be maintained within a permissible range by a suitable geometry or by a resistance on the part of the significant elements to pressure or to tension. It is possible for excessive forces to be reduced in certain regions by the plastic deformation of a permissible part of the thin-film regions. The pressure elements 2.1, 2.2 are designed such that they will not buckle under any circumstances under typical operating loads. Clearly shown in FIG. 3 is the manner in which the tilting step is moved about the thin-film region 10, coming to rest in its open position. In the positions illustrated both in FIG. 2 and in FIG. 3, all the elements of the tilting step are essentially stress-free. In principle, bending effects in the intermediate members 20.1, 21.2 and in the connecting elements 5.1, 5.2 are not required during the tilting action. There is no deflection or buckling of the connecting elements.

Figure 4:
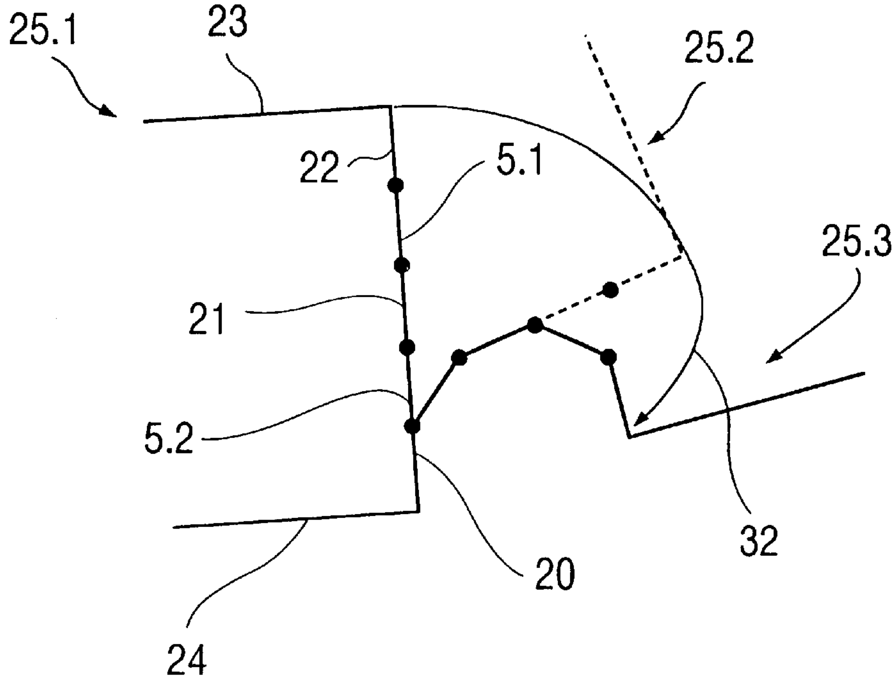

A possible relative movement of the hinge parts 23, 24 of a hinge 25.1 is schematically illustrated in FIG. 4. In this instance, the hinge parts 23, 24 are connected via two series-connected tilting steps. The first tilting step comprises the intermediate members 20, 21 and the connecting elements 5.2. The second tilting step comprises the intermediate members 21, 22 and the connecting elements 5.1. FIG. 4 shows three tilted states of the hinge. The hinge is illustrated in the closed state 25.1, in the first tilted state 25.2, i.e. with the first tilting step open, and finally in the open state 25.3, in which state both tilting steps are open. The opening path of the hinge is indicated by the spatial curve or arrow 32. It is possible for this opening path 32 to be influenced considerably by the arrangement and design of the partial tilting steps. It will be seen in FIG. 4 that the opening path indicated differs considerably from conventional circular opening paths, which are imposed in particular in the case of hinges having a fixed rotational movement axis. Yet, in contrast to other known hinges which do not have a rotational axis, a defined movement path is nonetheless provided. The first tilting step, formed by the connecting elements 5.2 and the intermediate members 20, 21, either has a smaller snapping force or the same snapping force as the second tilting step, which comprises the connecting elements 5.2 and the intermediate members 21, 22, but will then have a geometrically imposed earlier snap effect. When the hinge is opened, the first tilting step first leaps into its open state. All the three tilting states indicated in FIG. 4 are essentially stress-free, since the factors according to the invention and described in more detail hereinafter are incorporated.

Figure 5:
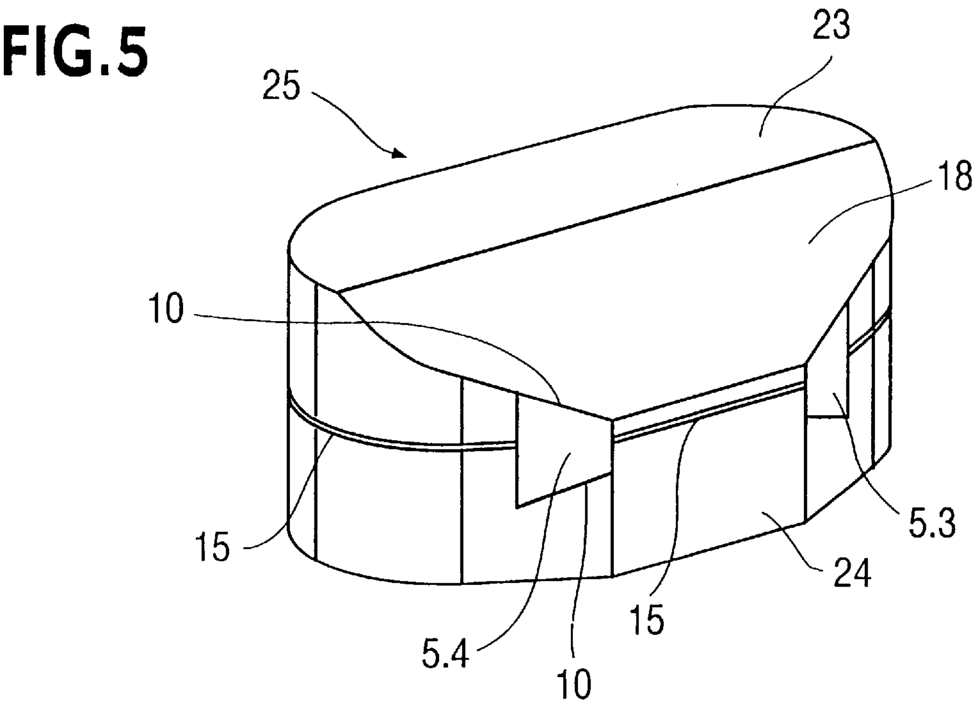
FIG. 5 shows an exemplified application of a tilting step according to FIGS. 2 and 3 in a one-piece injection-moulded plastics closing means 25, when the closing means is closed.
Figure 6:
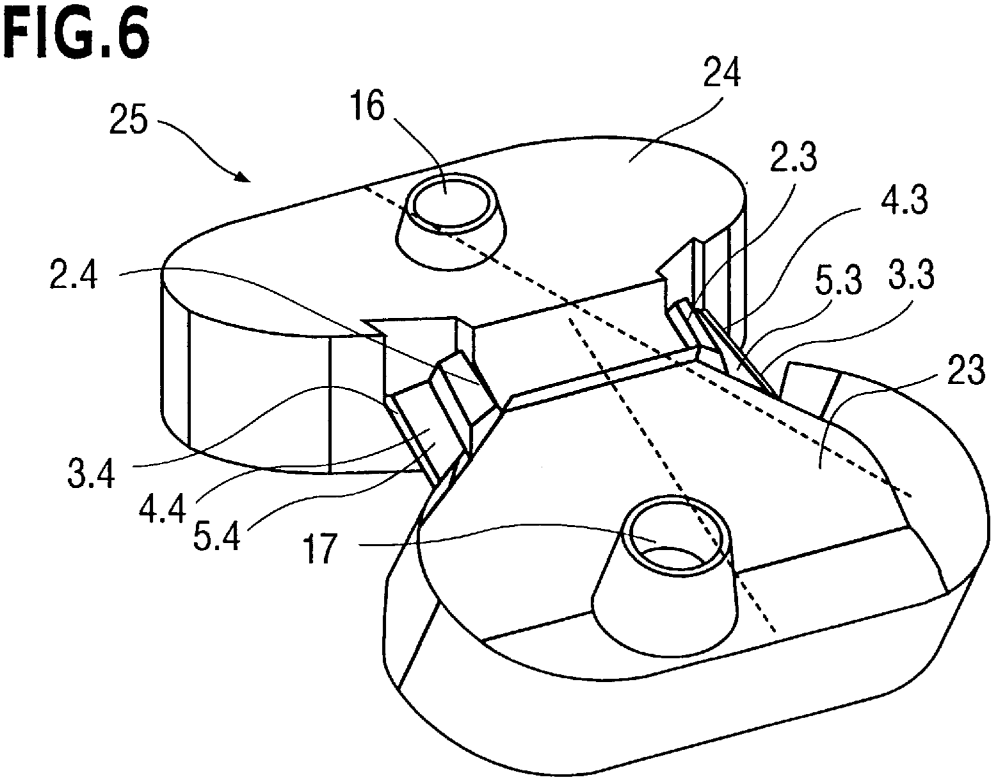
FIG. 6 shows the plastics closing means of FIG. 5 in the open state

FIGS. 5 and 6 then illustrate an application of such a tilting step in a one-piece injection-moulded plastics snap-closing means 25. The closing means 25 comprises two hinge parts, i.e. the closure body 24 and a corresponding lid 23. An outflow opening 17 on the closure body 24 is to co-operate with a counterpart 16 in the lid 23. The hinge parts are separated by a sealing plane 15. In this instance, the closing means comprises a single tilting step comprising connecting elements 5.3 and 5.4. The connecting elements 5.3, 5.4 are connected to the lid 23 and the closure body 24 by means of thin-film regions 10. Since, in this instance, only a single tilting step is provided, the intermediate members described above are substituted by the lid 23 and the closure body 24 themselves. The geometry of this tilting step permits an overall working angle of more than 180° and, thus, an opening angle of 200° in this instance, such that, in the open position (FIG. 6), the closing means is downwardly inclined relative to the sealing plane, thereby rendering the outflow opening 16 fully accessible. In an ideal design of the closing means, when only minimal or no plastic deformations occur during the operation of the closing means, the opening angle (position during injection moulding) and the working angle of the tilting step have identical values. A slope 18 makes it possible to produce the plastics lid, without any substantial tooling outlay, such that it is possible to arrive in the open position mentioned without the outer walls of the parts of the closing means obstructing each other. It is, of course, possible for a corresponding closing means to be injection-moulded in a 180° open position, if this is desirable for reasons relating to the tooling equipment. The connecting elements 5.3 and 5.4 each consist of the very rigidly designed pressure elements 2.3, 2.4, the tension elements 3.3, 3.4 and the pushing membranes 4.3, 4.4 disposed therebetween. The outer side of the connecting elements 5.3, 5.4 is designed to be flat and is optimally incorporated within the outer contour of the closed plastics lid. The cross-section of the plastics lid in FIGS. 4 and 5 is optimal for the use of the tilting step illustrated herein, since it is possible to provide straight thin-film regions 10 and optimal looping angles. It is, however, also possible for this type of tilting step to be combined with other geometries of the closing means. It is certainly possible to use circular cross-sections, or cross-sections other than those described herein, or to provide slightly curved thin-film regions 10 or, instead, to provide other hinging means. In order to ensure a good snap effect, the thin-film regions are to be designed, if at all possible, as ideal hinge axes. It is, of course, also possible to provide suitable functionally identical means. When the outer contours are curved, it is possible for the connecting elements to be shaped accordingly. A particular advantage of the invention resides in that it is possible for the connecting elements 5.3, 5.4 to be arranged, in principle, independently of the position of the sealing plane. It is thus possible, for example, for these to be displaced in a vertical direction against the closure body 24 and to be incorporated fully therein, which provides considerable freedom for the geometries of the closing means and the possible designs thereof. It is clearly shown in FIGS. 5 and 6 that, in the closed state, the tilting step is disposed perpendicularly relative to the hinge parts, or to the sealing plane and, in this instance, passes directly over into the rigid closure body 24 or into the lid 23.

Figure 7:
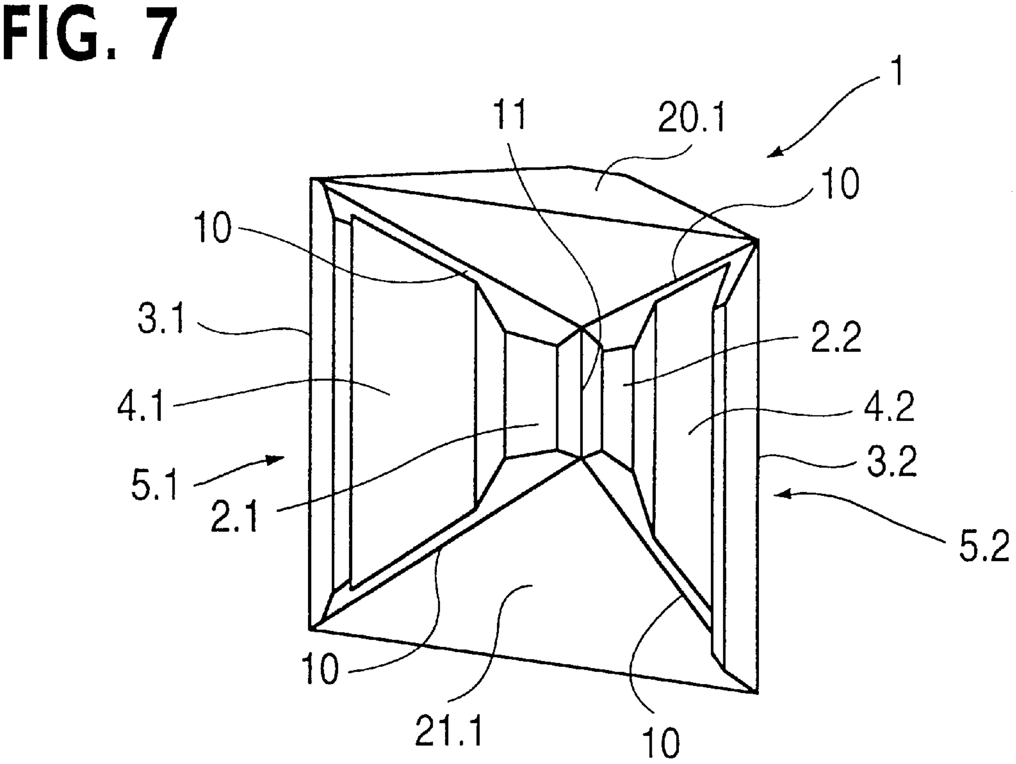
FIG. 7 shows a tilting step 1 comprising two pressure elements 2.1, 2.2, which are connected via a thin-film region 11, in the closed state

A further preferred exemplified embodiment of a tilting step 1 is illustrated in FIG. 7. This tilting step comprises two pressure elements 2.1, 2.2 and two tension elements 3.1, 3.2 which are, in each case, arranged parallel to each other. The pressure elements 2.1, 2.2, which are designed to be rigid, are disposed immediately adjacent to a middle plane of the hinge and are interconnected via a thin-film region 11. This middle plane need not of necessity coincide with the plane of symmetry. In this preferred embodiment, it is possible, for aesthetic reasons, in each case for one tension element 3 to be connected to a pressure element 2 by means of a thin shear-resistant membrane 4.1, 4.2. It is, of course, possible in the present embodiment and in other embodiments for the wall thicknesses to vary, although it must be ensured that those functions of a tilting step which are significant as far as the invention is concerned are maintained. It is, for example, possible for the pushing or shear element 4.1 to be designed to have a wall thickness which corresponds to the wall thickness of the tension element 3.1, 3.2 or to have, in certain regions, a greater wall thickness, provided that the functional tensional elasticity of the tension element 3.1, 3.2 continues to be provided. The present connecting elements 5.1, 5.2 are directly interconnected via the thin-film regions 11, and each comprises a definite reinforced pressure side and a relatively thin tensionally elastic tension side.

Figure 8:
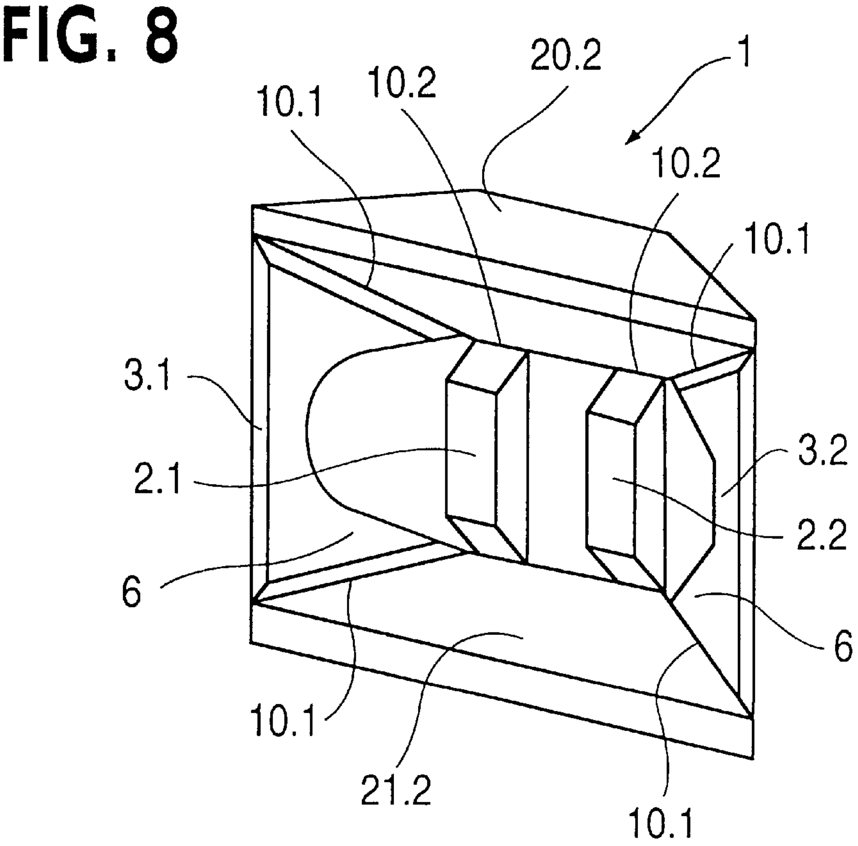
FIG. 8 shows a further exemplified embodiment of a tilting step 1 comprising partial pushing elements 6

A further embodiment of a tilting step 1 is illustrated in FIG. 8 and comprises two pressure elements 2.1, 2.2 and two tension elements 3.1, 3.2. The rigidly designed pressure elements 2.1, 2.2 are attached to the adjoining rigid intermediate members 20.2, 21.2 by means of two thin-film regions 10.2 which are disposed perpendicularly relative to the principal movement plane. The tension elements 3.1, 3.2 are designed such that each is attached to the intermediate members 20.2, 21.2 by means of two relatively long thin-film regions 10.1. The transition region between the long thin-film regions 10.1 and the tension elements 3.1, 3.2, in this instance, assumes the function of the pushing elements described above. The pushing elements are, in this instance, connected to the tension elements 3.1, 3.2. In this regard, the connecting elements 5 are no longer to be understood as being spatial units, yet they continue to incorporate the functional parts which are essential as far as the invention is concerned, i.e. the pressure element, tension element and pushing or shear element. If the two thin-film regions 10.1 of one tension element were to be connected continuously, this would produce a trapezoidal membrane. In order to obtain relatively tensionally-elastic tension elements 3.1, 3.2, the actual tension edge of the membrane is left intact, while a corresponding recess is provided on that side facing the pressure element. The tension element thus formed is capable of introducing relatively large tensile forces into a relatively long thin-film region, thereby reducing the load on the latter.

A further preferred embodiment of a tilting step comprises two tension elements and two pressure elements, the latter two being rigidly interconnected. The thus incorporated rigidly designed pressure elements are disposed in the middle plane (but not necessarily in the plane of symmetry) of the hinge and are attached to two adjoining rigid intermediate members which are disposed perpendicularly relative to the principal movement plane. If the tension and pressure elements are connected along their entire length by a shear-resistant thin membrane, and if the membrane with thin-film regions is connected to the intermediate members, a trapezoidal region, comprising the tension element and the pushing element, is provided.

The concept of the invention is to be illustrated in its comprehensive significance by referring to the following FIGS. 9–12. The operation is explained in more detail with reference to a specific case of a tilting step. It is, in principle, possible to vary the partial angle, the snapping force and the material load in respect of a tilting step by the specific selection of the geometric angles and lengths. Again, it must be emphasized that each tilting step basically encompasses only a partial angle of the entire hinge movement. In the simplest case of a single tilting step as described hereinafter, the partial angle of the tilting step does, however, correspond to the overall working angle. The necessary correlation will be described in more detail hereinafter.

Figure 9:
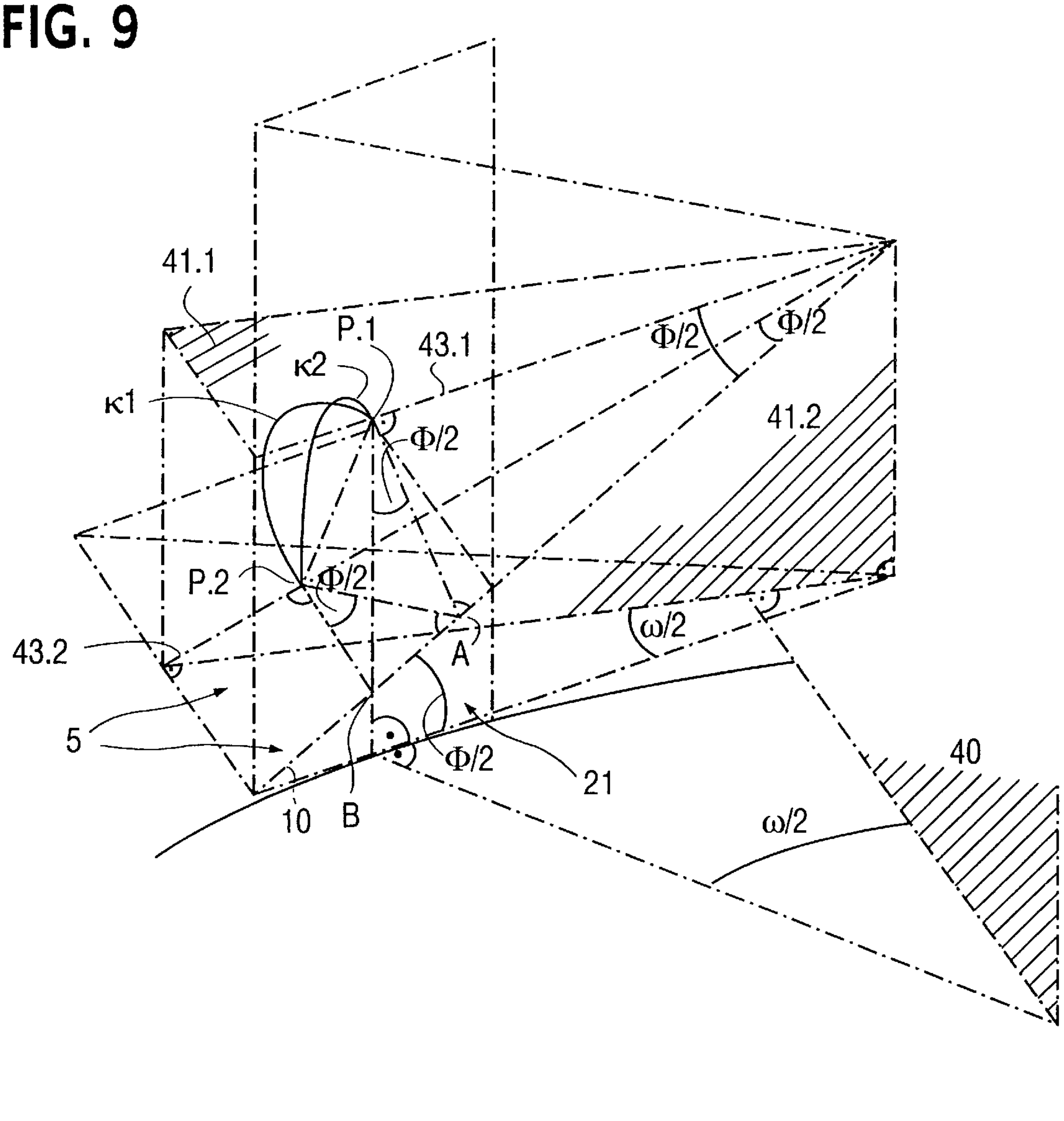
FIG. 9 schematically shows the operation of a specific exemplified embodiment having an overall working angle of 180°.

FIG. 9 schematically shows an embodiment comprising only one tilting step, in respect of which only the part of a connecting element 5 is shown in this instance. In this instance, the tilting step is characterized by two planes of symmetry 40, 41 (shown at positions 41.1, 41.2). These planes of symmetry 40, 41 (at positions 41.1, 41.2) are generally maintained in any opening position of the hinge. The present embodiment has a (theoretical) working angle of 180°. It will be assumed, hereinafter, that a position having an opening angle of 0° is to be understood as being the illustrated closed state, and an open position is understood to have an opening angle of 180°. In explaining the functioning of this specific embodiment, reference is made to the two above-mentioned planes of symmetry. When viewed in this manner, it is possible to explain the function by referring to part of the problem. For the sake of simplicity, in each case one pressure element and one tension element are regarded as being disposed in one plane and to be a geometric unit. The following parameters are important as far as the invention is concerned. On the one hand, the angle Φ between two herein assumed thin-film regions of an intermediate member, or the angle enclosed by the lines defined by the end points of the pressure elements and the tension elements. The looping angle ω is that angle which is observed in a plan view of the hinge, between the planes of the intermediate members in the closed position (cf. FIG. 1, arrows 30, 31). In so far as the intermediate members in other embodiments are not disposed perpendicularly to the hinge parts or the pressure and tension elements are not aligned parallel to each other, the angle ω must be determined accordingly. In the present parallel arrangement of the pressure and tension elements, the plane defined by the pressure elements and the plane defined by the tension elements (not illustrated in any detail in FIG. 9) are accordingly spaced away from each other. Both angles are instrumental in determining the coercion (and, thus, the snapping force) on the intermediate members and the opening angle. The planes of symmetry are illustrated in FIG. 9. During the entire movement sequence, the plane 40 of symmetry is the stationary plane of the tilting step. It generally constitutes the plane of symmetry between the connecting elements 5.

The plane 41 (at positions 41.1, 41.2) of symmetry is displaceable and constitutes the second plane of symmetry in every stage of movement. It constitutes, in-each case, the plane of symmetry of each connecting element 5 with respect to itself. In FIG. 9, its position is shown in the closed position 41.1 and in the open position 41.2 of the tilting step.

On the basis of the symmetry conditions, the functioning is considered with reference to a partial model which constitutes a quarter of the tilting step. This partial model is illustrated in FIG. 9. It shows half of an intermediate member 21 and a part of a connecting element 5. The model illustrated approximately describes the mechanical sequences in the tilting step. The correlations and the coercion brought about, bringing about the snapping force, are illustrated in model-fashion hereinafter. The term 'coercion' is understood to be the deformation imposed on the material, said deformation causing an elastic (reversible) state of stress. The material resists the imposed elastic deformation, causing the snap effect. According to the invention, specific tension and pressure zones are provided. The regions which are described as pressure regions are designed such that a deflection out of their plane is prevented. The regions which are described as tension zones may be varied as far as their length and thickness are concerned, such that the extension (the load on the material) imposed as a result of the geometry remains within the elastic (reversible) behaviour of the material. The design of the tilting step, being symmetrical relative to the plane 41 of symmetry, ensures a good snapping force, in that a double-hinge effect within the tilting step is prevented.

It is assumed that, for the presentation of the model, the thin-film regions 10 (see FIGS. 2, 3, 5, 7, 8) operating as hinges are regarded as being ideal hinges. An ideal hinge is understood to be a hinge which experiences no internal friction and no extensions in the hinge parts themselves. It is thus assumed that the rotational movement of all points is free of friction about a hinge axis 45. The parts described as the intermediate members 21 are presumed to be non-deformable. Each connecting element 5 is regarded as being an element which is elastic in the tension range in its plane. The connecting elements 5 always remain in a plane, such that a deflection out of this plane is regarded as being unacceptable.

The reference numbers *.1 in each case refer to elements in the closed position, while those comprising *.2 refer to elements in the open state. The reason for the coercion is best understood when a point P is viewed in a given space. This point P is disposed on the line 43 of symmetry of the intermediate members 5 and in the displaceable plane 41 of symmetry. Its position is dependent on the opening angle of the tilting step. The position of P on the line of symmetry is not relevant for the purposes of this consideration. P would, due to the hinge conditions to which it is subjected, move on the orbit k1 with the centre at point A and the hinge axis 45 as the rotary axis. Due to the symmetry conditions of the tilting step, as imposed according to the invention, the point P is, however, forced on to a curve k2, which is approximately indicated in the model as a circle with the centre at B.

A straight line e2 between the stationary point B and the moving point on k2, said line not being shown in FIG. 9 for the sake of greater clarity (cf. FIG. 10), constitutes the surface normal on the plane 41 in its point disposed on k2, at every opening angle of the tilting step. This straight line e2 moves together with the connecting element 5. A straight line e1, between the stationary point B and the moving point on k1, would describe the straight line e2 if the latter was not subjected to any coercion. Also clearly indicated in FIG. 9 are the half of the looping angle ω2 and the angle Φ/2, which have a decisive influence on the snap effect.

Figure 10:
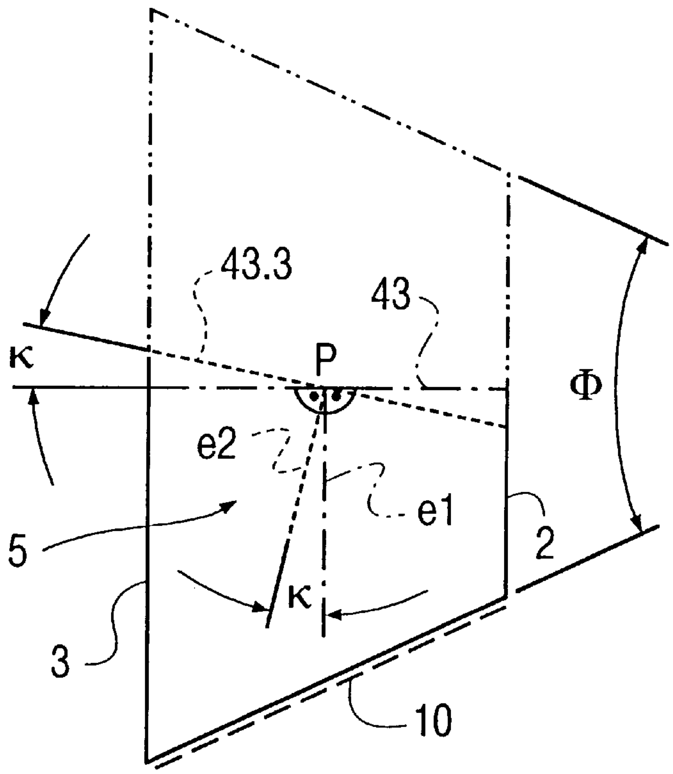
FIG. 10 schematically shows a connecting element 5 with an illustrated coercion angle K

FIG. 10 schematically shows the coercion state of half of the connecting element 5. Reference number 43.3 designates the position of the line 43 of symmetry as a result of the coercion. The pressure and tension regions 2, 3 of the connecting element 5 are also illustrated in the form of lines. The structural position of the point P, to determine the angle k, need not, of course, necessarily be disposed in the middle of the illustrated part of the line 43 of symmetry. On the other hand, the position depends on the selected strengths of the material of the pressure and tension regions 2, 3 and is determined by the neutral stress point on the straight line 43. In this instance, the neutral stress point is understood to be that point at which the stresses along the straight line 43 are in equilibrium.

Figure 11:
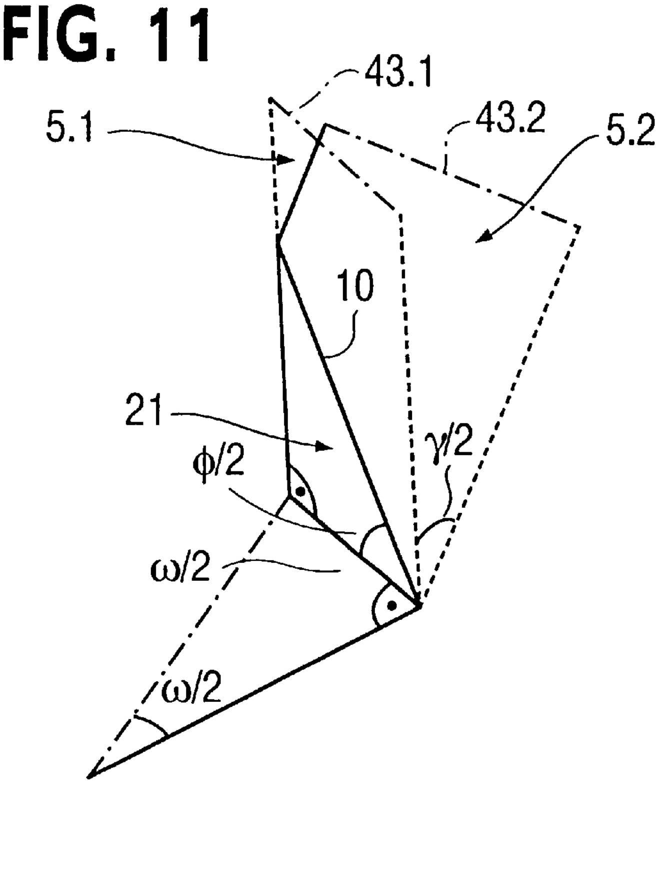
FIG. 11 shows a schematic illustration of a tilting operation with its angular relationships

FIG. 11 now shows, in a schematic partial illustration, the correlations in a tilting step having an opening angle γ of less than 180°. It is possible for the opening angle γ of a tilting step to be selected according to the requirements. The correlation described below must be met in order to ensure two stress-free states according to the invention in the closed and in the open position of a tilting step. These correlations according to the invention also apply for an opening angle γ of more than 180°. In addition to the intermediate member 21, which is only partially illustrated herein, half of a connecting element 5 is illustrated in the closed 5.1 and in the open position 5.2 The intermediate member 21 and the connecting element are connected via a hinge axis 45.

The correlation between the opening angel γof a tilting step, the looping angle ω and the angle Φ of the connecting elements for two stress-free states of the tilting step is defined by the following formula:

$$\Phi = 2 * \arctan\left[\frac{\sin(\gamma/2)}{1-\cos(\gamma/2)} * \sin(\omega/2)\right]$$

Figure 12:
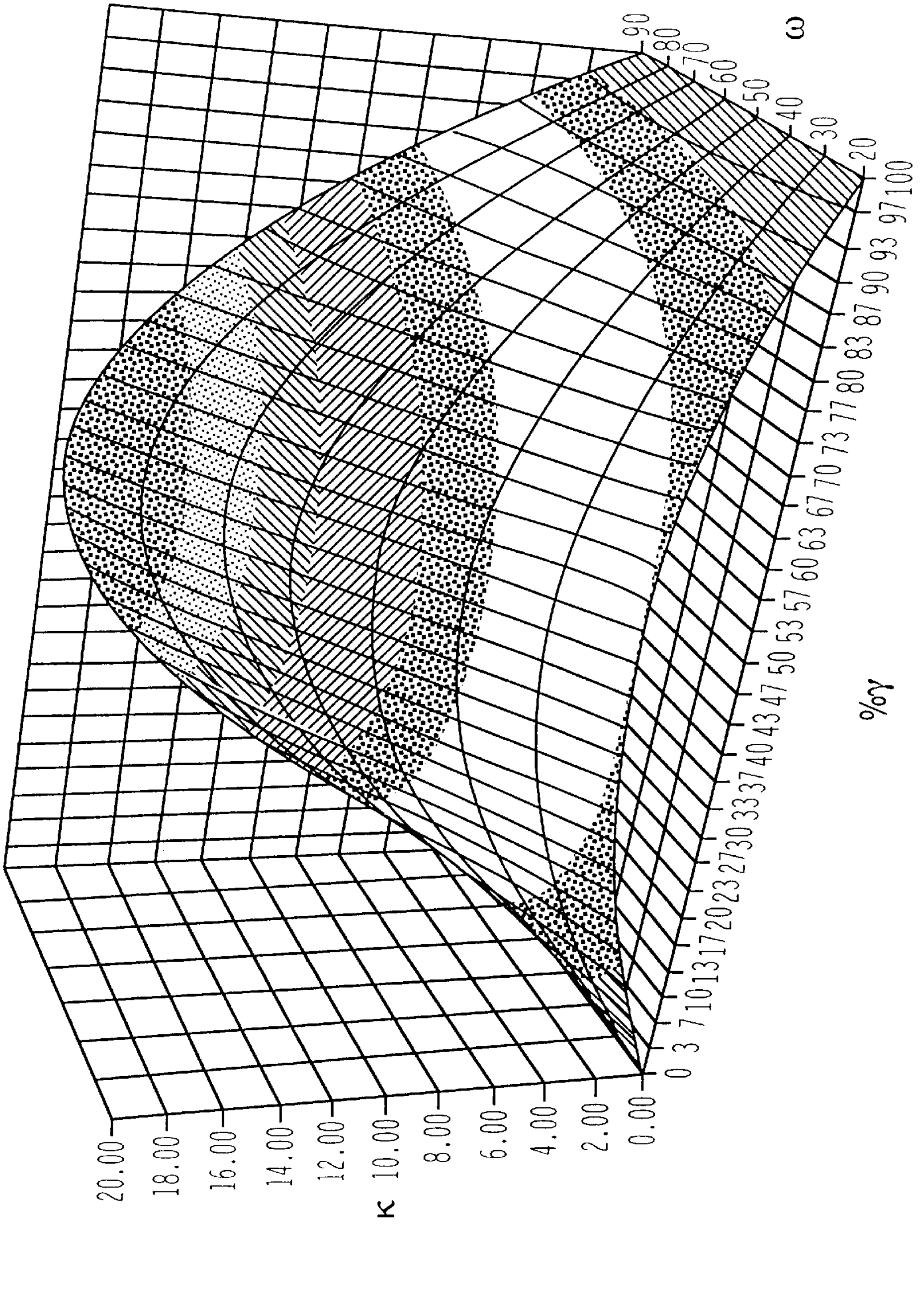
FIG. 12 shows a diagram relating to the geometrical optimization according to the invention

FIG. 12 illustrates a typical course of the coercion angle k of a tilting step as a function of the angle ω and the opening angle γ of a tilting step. In this regard, it is assumed that an angle Φ which leads to the stress-free end positions according to the invention is selected. As already stated above, k is a measure for the coercion of the material. At the given looping angle ω, the maximum coercion of the material and the dead centre of the snapping force is present in the points having a horizontal tangent. The dead centre is disposed at the half-point of the opening angle γ of the tilting step.

Figure 13:
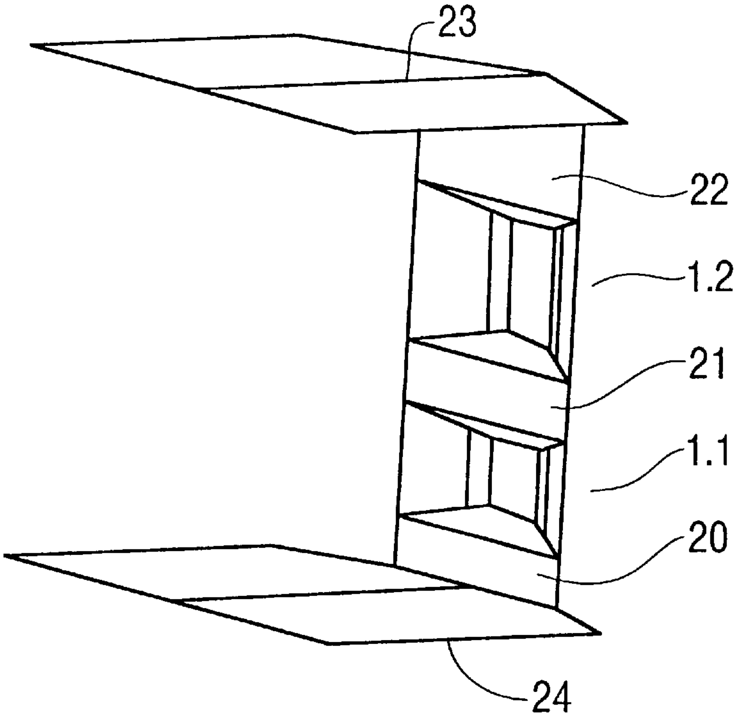
FIG. 13 shows an exemplified embodiment comprising two series-connected tilting steps 1.1, 1.2 in the closed state
Figure 14:
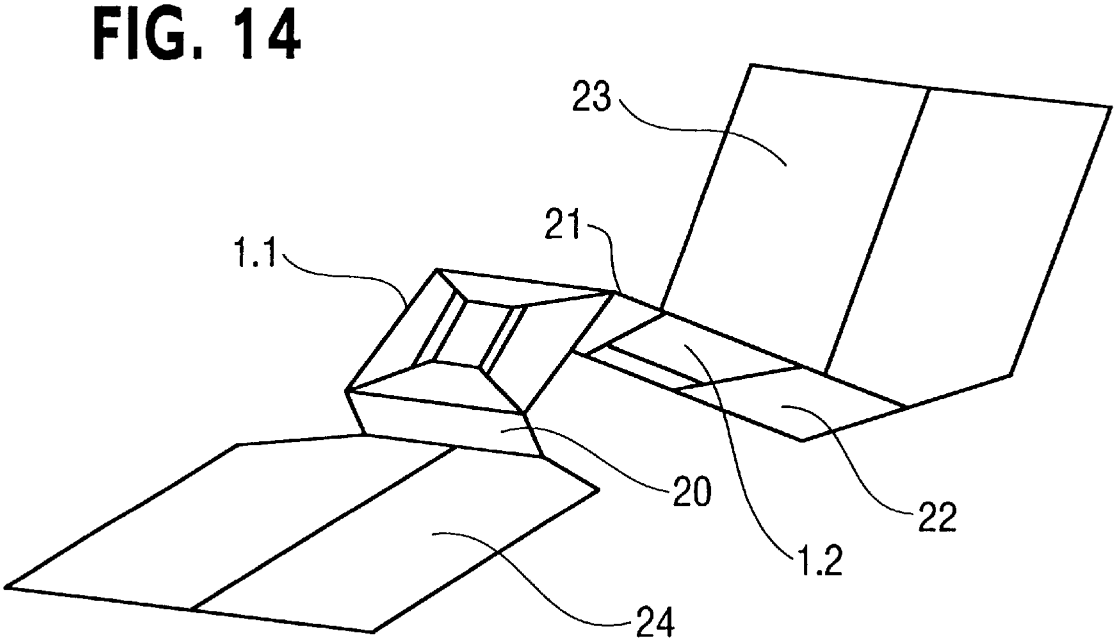
FIG. 14 shows the example of FIG. 13 in a partially open state, in which the first tilting step 1.1 is open
Figure 15:
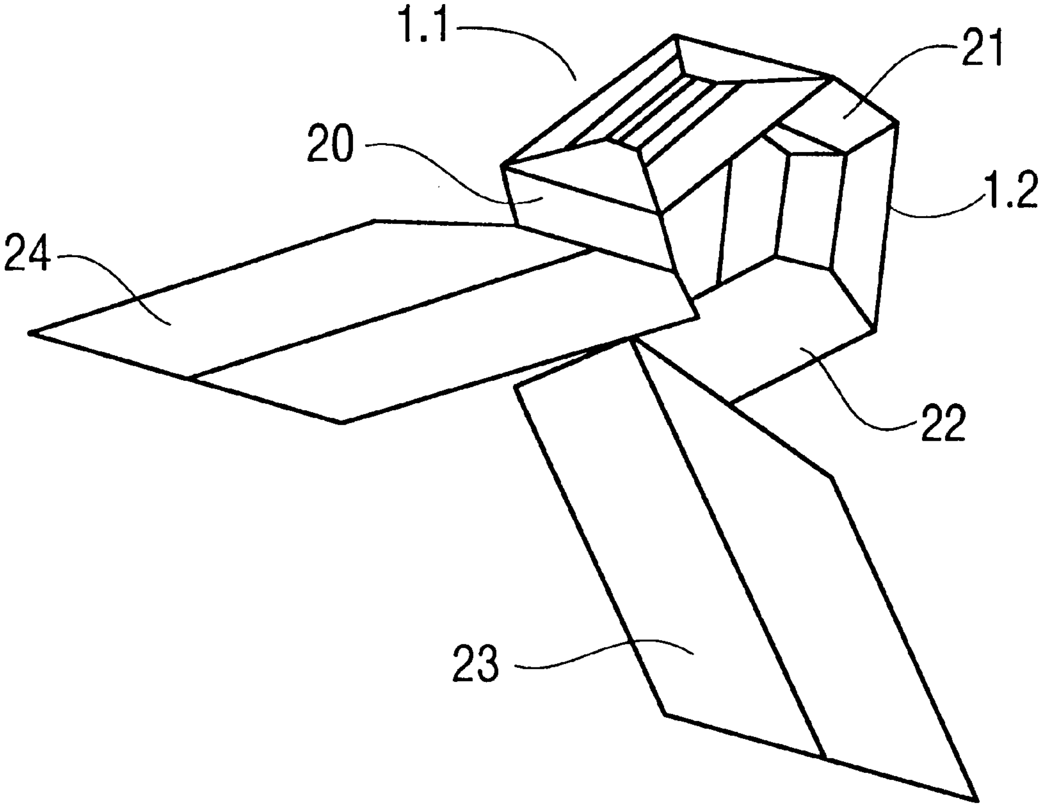
FIG. 15 shows the example according to FIG. 13 and FIG. 14 in the completely open state, in which the tilting steps 1.1, 1.2 are open

FIGS. 13–15 show a hinge comprising two tilting steps 1.1, 1.2 having rigid intermediate members 20, 21 and 22, and two hinge parts 23, 24. It is, of course, also possible for the tilting steps to pass over directly into the hinge parts. The tilting steps are illustrated diagrammatically and correspond, for example, to the tilting steps as described with reference to FIGS. 2 and 3. In FIG. 13, the hinge is illustrated in the closed state. When the tilting step 1.1 leaps into its open state, then the first theoretical stress-free tilting state of the hinge corresponds to the state illustrated in FIG. 14. In this tilting state, no outside forces are acting on the hinge. The tilting step 1.1 is completely open and the tilting step 1.2 is still completely closed. The hinge illustrated in FIG. 14 has already experienced its first partial snap effect. If the hinge is opened still further, a further dead centre is reached and the hinge leaps into a further substantially stress-free tilting state, which corresponds to FIG. 15. In the case of the hinge illustrated in FIGS. 13–15, this is the completely open tilting state. The opening angle of the diagrammatically illustrated hinge is considerably greater than 180°.

In particular in one-piece injection-moulded hinge parts, the invention prefers to provide an overall working angle of 180°, in order to simplify tool manufacture. For manufacturing reasons, tilting step geometries which have as few hinge points as possible, such as the exemplified embodiments illustrated, for example, in FIGS. 2, 3, 7 and 8, are to be preferred. A particular advantage of the invention also resides in that, with a small and maintenance-friendly tool outlay, due to the concentration of the functional elements, while dispensing with the need for slits or recesses, it is possible to provide a good sealing effect in the case of closing means, in particular in the region adjoining the hinge. It is possible for the seal to be provided according to the features set out in international patent application PCT/EP 95/00651, substantially dispensing with the need for recesses. In certain embodiments, it is also possible for the tension and pressure elements described to be arranged, not parallel to one another but at an angle relative to one another. For lengthy hinge parts, it is also possible to arrange two or more tilting steps adjacent to each other. In this regard, it is possible for the individual adjacently arranged elements of the tilting steps to have no mutual connection or, if desired, to be connected by a functionally non-crucial membrane. It is thus conceivable for a plurality of tilting steps to be combined functionally, in order, for example, to bring about an intensification of the snap effect.

We claim:

1. A resilient hinge arrangement comprising:

at least two hinged parts; and a pair of connecting elements pivotally connecting said hinged parts without the use of a principle main hinge axis, said connecting elements having at least two stable states, each of said connecting elements including, a rigid pressure element, a tensionally elastic tension element, a shear element providing shear resistance between said pressure element and said tension element, and hinges connecting each of said pressure elements and said tension elements directly or indirectly to one of the hinged parts.

2. The hinge arrangement according to claim 1, wherein said connecting elements are substantially stress-free in both the open position and the closed position.

3. The hinge arrangement according to claim 1 or claim 2, wherein the pressure and the tension elements of one connecting element are arranged parallel with respect to each other, and the planes defined by the pressure elements and by the tension elements are spaced away from each other.

4. The hinge arrangement according to one of claims 1 or 2, wherein the pair of connecting elements are pivotally interconnected along a hinge axis parallel to a principal movement plane.

5. The hinge arrangement according to one of claims 1 or 2, wherein the angle Φ, which is encompassed by the lines defined by the end points of the pressure elements and the tension elements has a value which complies with the formula:

$$\Phi = 2 * \arctan\left[\frac{\sin(\gamma/2)}{1-\cos(\gamma/2)} * \sin(\omega/2)\right]$$

wherein ω, in a plan view of the hinge, is the projected angle between two normal lines on to the planes defined by, in each case, one pressure and one tension element and γ is the opening angle between the two stable states.

6. The hinge arrangement according to claim 1, wherein the pressure elements and the tension elements are arranged relative to each other such that, in each opening position, a plane of symmetry, which is displaceable and is disposed perpendicularly relative to the principal movement plane, forms the plane of symmetry for the pressure elements and tension elements with respect to themselves.

7. The hinge arrangement according to claim 1, wherein the shear element is designed to be a shear-resistant membrane which connects the pressure element and its adjacent tension element along their entire length.

8. The hinge arrangement according to claim 1, wherein the shear element is connected to the intermediate members via elongate thin-film regions and to the tension element without any direct connection to the pressure element.

9. The hinge arrangement according to claim 1, wherein the pressure elements of the connecting elements are substantially rigidly interconnected.

10. A resilient hinge arrangement according to claim 1 or 2, wherein said hinged parts are connected to develop a plurality of stress-free states including the open position and the closed position ;

a dead center being disposed between each of said stress free states, the hinge arrangement, when moved from such a dead center, automatically and resiliently assuming the next adjacent stress-free state.

11. A one-piece injection-moulded plastic closure comprising:

a closure base having an opening provided therein;

a closure lid selectively covering said opening in said closure base; and connecting elements which connect said closure base and lid without the use of a principle main hinge axis, said connecting elements connecting said closure base and lid to provide at least two stable states therebetween, each of said connecting elements including, a rigid pressure element, a tensionally elastic tension element, and a shear element providing shear resistance between a said pressure element and an adjacent said tension element; and hinges connecting each of said pressure elements and said tension elements of said connecting arms to said closure base or closure lid.

12. The hinge arrangement according to claim 1, wherein intermediate members are provided as part of each said hinged part, said connecting arms being indirectly connected to the remainder of its said hinged part through said intermediate member.

13. The hinge arrangement of claim 1 wherein said tension element and said pressure element each have a thickness greater than that of said shear element.

14. The hinge arrangement of claim 1 wherein, in each connecting element, said shear element is connected to said pressure element and said tension element and has the same wall thickness as said tension element.

15. The hinge arrangement of claim 5, wherein the pressure and the tension elements of one connecting element are arranged parallel with respect to each other, and the planes defined by the pressure elements and by the tension elements are spaced away from each other.

16. The hinge arrangement according to claim 11, wherein the shear element is connected to the intermediate members via elongate thin-film regions and to the tension element without any direct connection to the pressure element.

17. The closure of claim 11 wherein at least one of said closure base or lid includes an intermediate member to which said hinge is connected.

18. The hinge arrangement of claim 11 wherein, in each connecting element, said shear element is connected to said pressure element and said tension element and has the same wall thickness as said tension element.

19. A hinge arrangement comprising:

first and second hinged parts;

first and second trapezoidal connecting elements spaced apart and connecting said first and second hinged parts without the use of a principal main hinge, said first and second trapezoidal connecting elements having at least two stable states; and hinges connecting each of said trapezoidal connecting elements to each of said first and second hinged parts, said hinges connected to each said trapezoidal connecting elements being non-parallel and converging;

each of said first and second trapezoidal connecting elements including, a pressure element provided between the converging ends of said hinges, a tension element between said hinges at the opposite ends of said hinges to said converging ends, and a shear resistant element providing shear resistance between said pressure element said tension element.

20. The hinge arrangement according to claim 19, wherein said connecting elements are substantially stress-free in both the open position and the closed position.

21. The hinge arrangement according to claim 20, wherein the pressure and the tension elements of one of said connecting elements are arranged parallel with respect to each other, and the planes defined by the pressure elements and tension elements of each said connecting element intersect.

22. The hinge arrangement according to claim 19, wherein the shear element is connected to the intermediate members via elongate thin-film regions and to the tension element without any direct connection to the pressure element.

23. The hinge arrangement of claim 19 wherein, in each connecting element, said shear element is connected to said pressure element and said tension element and has the same wall thickness as said tension element.

24. The hinge arrangement according to claim 19, wherein intermediate members are provided as part of each said hinged part, said connecting arms being indirectly connected to the remainder of its said hinged part through said intermediate member.

25. The hinge arrangement of claim 19 wherein said tension element and said pressure element each have a thickness greater than that of said shear element.

26. The hinge arrangement of claim 19 wherein said tension element absorbs tension forces by material elongation.

27. The hinge arrangement of claim 19 wherein said tension element absorbs tension forces by geometrical deformation.

28. A resilient hinge arrangement comprising:

at least two hinged parts; and an intermediate member provided between said hinged parts;

connecting elements which pivotally connect each of said hinge parts to said intermediate element without the use of a principle main hinge axis, said connecting elements having at least two stable states, each of which includes, a rigid pressure element, a tensionally elastic tension element, and a shear element providing shear resistance between a said pressure element and an adjacent said tension element; and hinges connecting each of said pressure elements and said tension elements of each said connecting arm to said intermediate member or to one of the hinge parts;

wherein plurality connecting elements are interconnected by an intermediate member therebetween such that the hinge arrangement has a number of stress-free states.

29. A resilient hinge arrangement according to claim 28, wherein a dead center is disposed between each of said stress free states, the hinge arrangement, when moved from such a dead center, automatically and resiliently assuming the next adjacent stress-free state.

30. A hinge arrangement interconnecting first and second hinged parts for pivotal movement between a closed position in which the parts are superimposed and an open position in which the parts are laterally adjacent, said hinge arrangement comprising:

said first and second hinged parts, and first and second trapezoidal connecting elements spaced form each other and integrally interconnecting said first and second hinged parts without the use of a principal main hinge axis;

first and second trapezoidal connecting elements being connected to said hinged parts at opposed ends of said connecting elements by angulated bending regions in such a way that said connecting elements are flat in both said closed and open position of said hinged parts.

31. The hinge arrangement of claim 30 wherein the angulated bending regions of each said trapezoidal connecting element define hinge axes that intersect, the area of each said trapezoidal connecting element closest to this intersection being thicker than the remainder of said trapezoidal connecting element.

* * * * *